United States Patent [19]

Kuwajima et al.

[11] Patent Number: 4,822,831
[45] Date of Patent: Apr. 18, 1989

[54] AQUEOUS DISPERSION TYPE RESIN COMPOSITION AND AN AQUEOUS COATING COMPOSITION CONTAINING THE SAME

[75] Inventors: Teruaki Kuwajima, Osaka; Hiroshi Miwa, Hyogo; Shinichi Ishikura, Kyoto, all of Japan

[73] Assignee: Nippon Paint Co., Ltd., Osaka, Japan

[21] Appl. No.: 906,014

[22] Filed: Sep. 11, 1986

[51] Int. Cl.$^4$ ................................................. C08K 3/20
[52] U.S. Cl. ................................... 523/421; 523/414; 523/502; 524/458; 524/460; 524/500; 524/504
[58] Field of Search ............... 524/458, 460, 500, 504; 523/414, 502, 421

[56] References Cited

U.S. PATENT DOCUMENTS 4,461,870  7/1984  Kanda et al. ..................... 524/512

Primary Examiner—Joseph L. Schofer
Assistant Examiner—J. M. Reddick
Attorney, Agent, or Firm—Wenderoth, Lind & Ponack

[57] ABSTRACT

A novel aqueous dispersion type resin composition obtained by the method comprising polymerizing at least one $\alpha,\beta$-ethylenically unsaturated monomer in an aqueous medium containing a water soluble resin with an amphoionic group of the formula

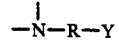

(in which R and Y are defined in the specification) and in the presence of an organic initiator, the solid weight ratio of said water soluble resin to said monomer being, 10:90 to 90:10. The aqueous coating composition based on said resin composition is excellent in storage stability, application characteristics and capable of resulting a coating with excellent film properties.

2 Claims, No Drawings

AQUEOUS DISPERSION TYPE RESIN COMPOSITION AND AN AQUEOUS COATING COMPOSITION CONTAINING THE SAME

FIELD OF THE INVENTION

The present invention relates to an aqueous dispersion type resin composition and an aqueous coating composition. More specifically, the invention concerns a novel aqueous dispersion type resin composition and an aqueous coating composition based on said resin composition, which is specifically useful as a top coat and which is excellent in storage stability and application characteristics and capable of resulting a coating with excellent film properties and especially water resistance, weather resistance, gloss, smoothness and the like.

BACKGROUND OF THE INVENTION

An aqueous coating composition is generally inferior to a solvent type composition in durability and water resistance of the formed coating and since it is unable to get a composition with a higher non-volatile content, application characteristics are rather poor. Even if an amount of water insoluble resin powders are compounded with an aqueous resin for the purpose of increasing the non-volatile content of the coating composition, viscosity of the compounded system is inevitably increased therewith and hence, a practical coating composition cannot be obtained. The inventors had formerly found that by the selective use of a particular water soluble resin which will fulfil the requirements that the water tolerance, expressed in terms of water dilution multiplicand of the resin for the solution incapable of reading out the defined type in the test wherein 5 g of aqueous varnish having a common viscosity usually employed in the manufacture of a coating composition are correctly weighed in a 100 ml beaker, diluted with an increasing amount of deionized water and a No. 1 type (26 point type) is read through the said beaker, is 4 or more, and the surface tension calculated for a 1% w/w aqueous solution is 51 dyne/cm or less, it is possible to formulate an aqueous coating composition comprising said water soluble resin and water insoluble resin powders uniformly dispersed therein with a wider solid weight ratio of 98:2 to 45:55 and without the fear of undesired increase in viscosity of the system, and it is thus able to increase the resinous content of a coating composition and have the composition with excellent application characteristics, as well as the improved dispersion stability and film properties. On the basis of these findings, a patent application was filed, which is now publicly opened as Japanese Patent Application Kokai No. 15567/83. The resinous powders used in that invention were prepared by pulverizing a solidified resin and shieving the same, and ever since various techinique have been developed to obtain the better quality powders to be compounded with a water soluble resin. In facts, certain improvements have been attained with these products in respect of application characteristics and storage stability of the coating composition and film properties including gloss and smoothness of the formed coating. However, in most of the heretofore proposed processes, the water insoluble resin powders were advantageously prepared by an emulsion polymerization of α, β-ethylenically unsaturated monomer(s) in an aqueous medium containing a surfactant or emulsifier and in the presence of a polymerization initiator, and therefore, it was unavoidable that the surfactant used was always remained on the surfaces of the formed particles, giving undesired effect on the film properties and especially on water resistance of the film and that when a water soluble radical initiator was selected, said initiator was likewise remained at the end portions of the polymer chain, giving undesired effect on film properties, too. Thus, an additional improvement has still been longed for. Moreover, with an increasing demand for high-grade articles, an aqueous type, top-coat composition capable of resulting a coating with far improved gloss and smoothness has been required, especially in an automobile and an electric appliance industries. It is, therefore, an object of the invention to provide a high quality, aqueous coating composition which is excellent in storage stability and application characteristics and capable of resulting a coating with excellent film properties including water resistance and the like and having far improved gloss and smoothness and which is specifically useful as a top coat for automobile bodies and other articles.

SUMMARY OF THE INVENTION

According to the invention, the abovesaid object can be attained with an aqueous coating composition comprising as resinous vehicle (1) an aqueous dispersion type resin composition obtained by the method which cmmprises polymerizing at least one α, β-ethylenically unsaturated monomer in an aqueous medium containing a water soluble resin having an amphoionic group of the formula:

in which R is substituted or unsubstituted $C_1$ to $C_6$ alkylene or phenylene group, and Y is —COOH or —$SO_3H$, and in the presence of an organic initiator, the weight ratio of said water soluble resin (in solid) to said monomer being 10:90 to 90:10, and (2) a water soluble resin.

DESCRIPTION OF SPECIFIC EMBODIMENTS

The present novel aqueous dispersion type resin composition 20 is prepared by polymerizing at least one α, β-ethylenically unsaturated monomer in an aqueous medium optionally containing an organic solvent, in the presence of a quantity of water soluble resin having an amphoionic group of the formula:

in which R and Y are as defined above and in the presence of an organic initiator and preferably a water insoluble organic initiator.

In the present invention, the term "water soluble resin" denotes either of water soluble resin and water reducible or dilutable resin.

The water soluble resin having an amphoionic group of the formula:

may be any of alkyd, polyester, acryl modified alkyd, acryl modified polyester, modified epoxy, acrylic, melamine and polyether resins having the amphoionic group of the formula:

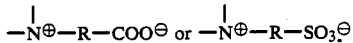

These resins can exhibit specific behaviors in regard to reactivity, surface activity, and electrochemical properties because of the presence of said amphoionic radical, and are very useful as emulsifier or stabilizing agent in that polymerization reaction. Alkyd resin and polyester resin are characterized by forming a series of ester chains using an essential components polycarboxylic acid and polyhydric alcohol. Therefore, when a part of said polyhydric alcohol is replaced by, for example, a compound of the formula:

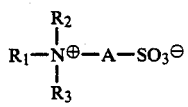

wherein $R_1$ represents an alkyl having at least one hydroxyl group, $R_2$ and $R_3$ are the same or different, each represents hydrogen or optionally substituted alkyl group, and A represents optionally substituted alkylene having 1 to 6 carbon atoms or phenylene group, it is possible to obtain alkyd or polyester resin having the abovesaid amphoionic group in its molecule. Reference may be made in this connection to Japanese Patent Applications of Nippon Paint Co., Ltd, Nos. 110865/79 and 56048/80 (Kokai Nos. 34725/81, 51727/81), filed on Aug. 30, 1979 and Apr. 26, 1980 respectively.

Among these resins, the members having an acid value of 30 to 150, and especially 40 to 150, and number average molecular weight of 500 to 5000, and especially 700 to 3000 are preferably used in this invention. Modified epoxy resins having the characteristic amphoionic radical of the formula:

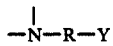

are stated, for example, in Japanese Patent Application of Nippon Paint Co., Ltd, No. 116293/80, filed on Aug. 22, 1980 (now laid open as Kokai No. 40522/82). In general, epoxy resin is characterized by having at the end of the polymer chain a group of the formula:

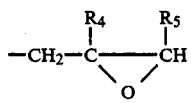

wherein $R_4$ and $R_5$ each represents hydrogen or methyl group. Therefore, it is possible to obtain a modified epoxy resin having at the end of polymer chain a quantity of such radical as

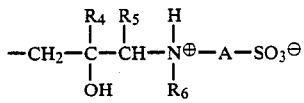

by the reaction of said epoxy resin with a compound of the formula:

$$R_6-NH-A-SO_3M$$

wherein $R_6$ is an alkyl group optionally substituted with a radical incapable of reacting with epoxy group, M stands for alkali metal or ammonium, and A has the same meaning as defined above. In proportion to the quantity of said amphoionic groups, the hydrophilic property of the modified epoxy resin will increase. Reference may be made in this connection to Japanease Patent Application of Nippon Paint Co., Ltd, No. 116293/80, filed on Aug. 22, 1980 (now laid open as Kokai No. 40522/82).

An acrylic resin having in its molecule a radical of the formula:

can be advantageously prepared by a solution polymerization using a free radical initiator from the combination of at least one polymerizable amino acid compound selected from

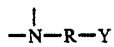

wherein $R_7$, $R_8$, $R_9$ and $R_{10}$ each represents a member selected from the group consisting of H, $CH_3$ and $C_2H_5$, $R_{11}$ is hydrogen or alkyl having 1 to 20 carbon atoms optionally including in its chain either one of $-SO-$, $-COO-$ and $-O-$ groups, $R_{12}$ represents alkylene group having 1 to 12 carbon atoms, optionally substituted with $-OH$, $-SH$, $-SR_{13}$ (in which $R_{13}$ is alkyl having 1 to 4 carbon atoms) or one or more of alkyl having 1 to 4 carbon atoms, and A represents COOH or $SO_3H$ group;

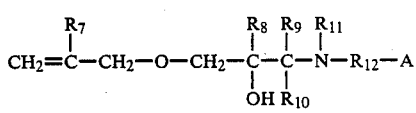

wherein $R_{14}$, $R_{15}$ and $R_{16}$ each represents H or alkyl having 1 to 6 carbon atoms, $R_{17}$ represents hydrogen or alkyl having 1 to 20 carbon atoms, optionally including in its chain either one of $-SO-$, $-COO-$ and $-O-$ group, or $R_{17}$ represents a radical of the formula:

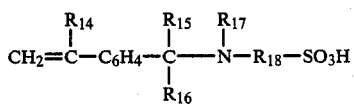

$R_{18}$ represents alkylene having 2 to 12 carbon atoms, optionally substituted with one or more of alkyl groups having 1 to 6 carbon atoms;

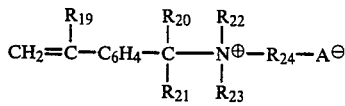

wherein $R_{19}$, $R_{20}$ and $R_{21}$ are the same or different and each represents H or $CH_3$, $R_{22}$ represents $C_1$ to $C_{20}$ alkyl having at least one hydroxyl group and optionally containing in its alkyl structure a group of —O— or —COO—, $R_{23}$ represents $C_1$ to $C_{20}$ alkyl having at least one hydroxyl group and optionally containing in its alkyl structure a group of —O— or —COO—, or H or $C_1$ to $C_{20}$ alkyl, $R_{24}$ represents optionally substituted $(CH_2)$ (in which is an integer of from 1 to 6), and A is COO or $SO_3$; and

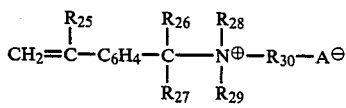

wherein $R_{25}$, $R_{26}$ and $R_{27}$ are the same or different and each represents H or $CH_3$, $R_{28}$ and $R_{29}$ are the same or different and each represents $C_1$ to $C_{20}$ alkyl optionally containing —0— or —COO—, or cycloalkyl group, or $R_{28}$ and $R_{29}$ taken together may form a hetero ring containing nitrogen atom, $R_{30}$ represents optionally substituted $(CH_2)$ alkylene in which is an integer of from 1 to 6, and A is COO or $SO_3$, and at least one polymerizable monomer selected from hydroxy bearing monomers, carboxyl bearing monomers, glycidyl bearing monomers, alkyl acrylates or methacrylates, N-containing alkyl acrylates or methacrylates, polymerizable amides, polymerizable nitriles, polymerizable aromatic compounds, α-olefines, vinyl compounds and diene compounds already stated hereinbefore. As to the details of these polymerizable amino acid compounds, reference should be made to Japanese Patent Applications of Nippon Paint Co., Ltd, No. 123899/78 (Kokai No. 51050/80), 125996/78 (Kokai No. 53251/80), 47651/80 (Kokai No. 145249/81) and 47652/80 (Kokai No. 145250/81) and as to amphor ionic radical bearing acrylic resin, to Japanese Patent Application of Nippon Paint Co., Ltd, No. 71864/81 filed on May 12, 1981. Preferably, these acrylic resins should have an acid value of 30 to 180, most preferably 40 to 160, and number average molecular weight of 500 to 10,000, and most preferably 700 to 6000.

Melamine resins having

radical may be prepared by using at least one hydroxyl bearing aminosulfonic type amphoionic compound represented by the formula:

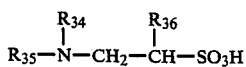

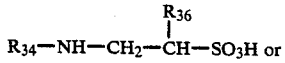

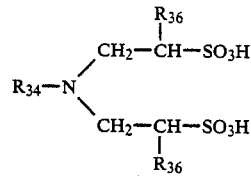

wherein $R_{34}$ represents $C_1$ to $C_{20}$ hydroxyalkyl optionally containing in alkyl structure a group of —O— or —COO—, $R_{35}$ has the same meaning with $R_{34}$ or represents lower alkyl, and $R_{36}$ represents H or methyl group, together with melamine and formaline and following the conventional means. The reaction conditions and procedures used are not of a specific, nature and in this connection, reference should be made to, for example, "A guide of synthetic resins for coating composition" by K. Kitaoka, published on May 25, 1974, Kobunshi Kankokai, pages 134 to 139. The abovesaid hydroxy bearing aminosulfonic type amphoionic compounds are described in more minute detail in Japanese Patent Application by Nippon Paint Co., Ltd, No. 170624/79 (now laid open as Kokain No. 92859/81). Polyether resins having

group may be prepared, as stated in Japanese Patent Application No. 116293/80 (Kokai No. 40522/82) filed on Aug. 22, 1980, by Nippon Paint Co., Ltd, by reacting a compound of the formula:

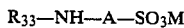

wherein $R_{33}$ is a substituent incapable of reacting with epoxy group, A represents an alkylene or phenylene, and M stands for alkali metal or ammonium group, to a polyether type epoxy resin having at the end of the polymeric chain a group of the formula:

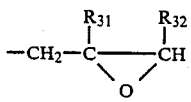

wherein $R_{31}$ and $R_{32}$ each represents hydrogen or methyl group, thereby obtaining a modified polyether type epoxy resin having at the end of polymeric chain a group of the formula:

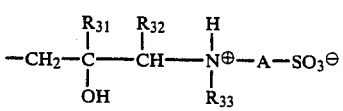

Various polyether type epoxy resins are commercially available. All of the abovementioned resins do possess in their molecule a characteristic amphoionic group of

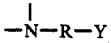

and can be provided as a water soluble type resin.

In this invention, such resin having an amphoionic group is presented in a polymerization system in a comparatively larger quantity, i.e. 90 to 10 weight percent of the total of the monomer and said resin, and at least one α, β-ethylenically unsaturated monomer is polymerized in an aqueous medium in the presence of said water soluble resin, using an organic initiator.

As the α, β-ethylenically unsaturated monomer, mention is made of the following.

(1) carboxyl bearing monomers as, for example, acrylic acid, methacrylic acid, crotonic acid, itaconic acid, maleic acid and fumaric acid, (2) hydroxyl bearing monomers as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol and methally alcohol, (3) nitrogen containing alkyl acrylates or methacrylates as, for example, dimethylamino ethyl acrylate, and dimethylaminoethyl methacrylate, (4) polymerizable amides as, for example, acrylic amide and methacrylic amide, (5) polymerizable nitriles as, for example, acrylonitrile and methacrylonitrile, (6) alkyl acrylates or methacrylates as, for example, methyl acrylate, methyl methacrylate, ethyl acrylate, n-butyl acrylate, n-butyl methacrylate, and 2-ethylhexyl acrylate, (7) polymerizable aromatic compounds as, for example, styrene, α-methyl styrene, vinyl toluene and t-butyl styrene, (8) α-olefins as, for example, ethylene and propylene, (9) vinyl compounds as, for example, vinyl acetate and vinyl propionate,

(10) diene compounds as, for example, butadiene and isoprene, and the like.

These monomers are used alone or in combination. As a part of said monomer, one may use the so-called crosslinking monomer having 2 or more ethylenically unsaturated, polymerizable bonds. They may be polymerizable unsaturated monocarboxylic esters of polyhydric alcohol, polymerizable unsaturated alcoholic esters of polycarboxylic acid and aromatic compounds substituted with more than 2 vinyl groups. Examples of such members are ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetra acrylate, pentaerythritol dimethacrylate, pentaerythritol trimethacrylate, penta erythritol tetramethacrylate, glycerol diacrylate, glycerol dimethacrylate, glycerol allyloxy dimethacrylate, 1,1,1-tris-hydroxymethylethane triacrylate, 1,1,1-tri-hydroxymethylethane dimethacrylate, 1,1,1-tris-hydroxy methylethane trimethacrylate, 1,1,1-tris-hydroxymethylpropane diacrylate, 1,1,1-tris-hydroxymethylpropane triacrylate, 1,1,1-tris-hydroxymethylpropane dimethacrylate, 1,1,1-tris-hydroxymethylpropane trimethacrylate, triallyl cyanurate, triallyl isocyanurate, triallyl trimellitate, diallyl terephthalate, diallyl phthalate and divinyl benzene.

Crosslinking monomers may also be of the combination of two ethylenically unsaturated monomers each bearing mutually reactive functional group as, for example, the combination of epoxy bearing ethylenically unsaturated monomers, such as glycidyl acrylate and glycidyl methacrylate, and carboxyl bearing ethylenically unsaturated monomers, such as acrylic acid, methacrylic acid and crotonic acid. Other examples of combination of mutually reactive functional groups are amine and carbonyl, epoxide and acid anhydride, amine and acid chloride, alkyleneimine and carbonyl, organoalkoxysilane and carboxyl, hydroxyl and isocyanate, and the like. By using such crosslinking monomer, particles of crosslinked copolymer can be obtained.

The abovesaid monomers are polymerized in an aqueous medium and in the presence of a water soluble resin and at that time, an organic initiator is advantageously used. As the organic initiator, use can be made of such members as diacyl peroxides (e.g. acetyl peroxide, lauroyl peroxide, benzoyl peroxide and the like), hydroperoxides (e.g. cumene hydroperoxide and the like), alkyl peroxides (e.g. di-t-butyl peroxide, t-butyl peroxy 2-ethyl hexanoate, t-butyl perpiperate, t-butyl perbenzoate and the like), azo compounds (e.g. 2,2-azobisisobutyronitrile and the like), disulfides (e.g. tetramethyl thiuram disulfide and the like), and sulfinic acids (e.g. p-toluene sulfinic acid and the like).

Among them, particular preference is given to a water insoluble organic initiator as azobisisobutyronitrile, benzoyl peroxide, di-t-butyl-peroxide, cumene hydroperoxide and the like.

Usually, water is used as a reaction medium, but in a more preferable embodiment of the invention, a mixture of water and an organic solvent is used as the medium. The inventors have found that when an aqueous composition is prepared by a method wherein α, β-ethylenically unsaturated monomers are polymerized in a mixture of water and an organic solvent and in the presence of a large quantity of water soluble resin (A) having an amphoionic group and a water insoluble organic initiator, and compounded with a water soluble resin (B) hereinafter mentioned, a particularly useful aqueous coating composition can be obtained, which is less foaming, hardly give pinholes, less sagging and capable of resulting a coating with high gloss and far improved smoothness. Therefore, in a preferred embodiment of the invention, the aqueous composition (1) is prepared in a reaction medium comprising water and an appropriate amount of a common organic solvent customarily used in the preparation of solvent type coating composition.

Thus, in the present invention, it is essential that an aqueous composition containing resin particles be prepared by the polymerization of at least one α, β-ethylenically unsaturated monomer in an aqueous medium optionally blended with an organic solvent and in the presence of a large quantity of a water soluble (A) having an amphoionic group and in the presence of an organic initiator, preferably a water insoluble organic initiator. In this aqueous composition, the water soluble resin (A) having an amphoionic group is physically adsorped on or bound with the resin particles and the particles are stably dispersed in the medium by the high molecular effect of said water soluble resin (A).

Since the aqueous composition does not include any of the undesired water-soluble by-products, ionic substances and other impurities, and the water soluble resin per se is useful as a binder resin, there are no undesired effects the properties of the formed coating coming from the presence of emulsifier or surfactant usually found in a conventional coating composition.

The water soluble resin (B) to be compounded with the abovesaid aqueous composition may be any of the water soluble resins customarily used in paint industry. They may be of water soluble or water dispersible type. The present coating composition is, thus, characterized by containing as resinous vehicle an aqueous dispersion type resin composition obtained by the particular method defined herein and a water soluble resin (B).

The present coating composition may be used as a clear coating composition as desired, and however, in most applications, it is used as a color lacquer. In that case, coloring matter, crosslinking agent and other additives, including antisagging agent, antiflooding agent, anticratering agent, surface conditioner, antioxidant, light stabilizer, UV absorber, antisettle agent and the like, may be added therewith.

The coating composition can be applied, as it is or after being diluted with water, in a conventional way, e.g. spraying, dipping, brushing or the like, and dried or baked at an elevated temperature to give the coating with excellent properties as hereinbefore stated.

The invention shall be now more fully explained in the following Examples. Unless otherwise being stated, all parts and % are by weight.

REFERENCE EXAMPLE 1

Preparation of polyester resin having an amphoionic group:

Into a 2 liters flask fitted with a stirrer, a nitrogen gas inlet tube, a thermoregulator, a condenser and a decanter, were placed 191 parts of hydroxyethyl taurine, 140 parts of ethylene glycol, 170 parts of triethylene glycol, 331 parts of adipic acid, 168 parts of phthalic anhydride and 40 parts of xylene, and the mixture was heated, while removing the formed water azeotropically with xylene out of the system. The temperature was raised to 190° C. in about 2 hours from the commencement of reflux and the reaction was further continued, under stirring and while removing water, until the carboxylic acid equivalent acid value reached to less than 10. Thus obtained polyester resin had an acid value of 79, a hydroxyl value of 79 and a number average molecular weight of 708.

REFERENCE EXAMPLE 2

Preparation of polyester resin having an amphoionic group:

Into a 2 liters flask fitted with a stirrer, a nitrogen gas inlet pipe, a thermoregulator, a condenser and a decanter, were placed 134 parts of bishydroxyethyl taurine, 130 parts of neopentylglycol, 236 parts of azelaic acid, 186 parts of phthalic anhydride and 27 parts of xylene, and the mixture was heated, while removing the formed water azeotropically with xylene. The temperature was raised to 190° C., in about 2 hours from the commencement of reflux and stirring and dehydration were continued until the carboxylic acid equivalent value reached 145. Then the reaction mixture was allowed to cool to 140° C., and while maintaining the same temperature, 314 parts of Cardura E-10 (glycidyl versatate, manufactured by Shell Chem. Co.) were added dropwisely in 30 minutes. After continuing stirring for 2 hours, the reaction was completed.

The thus obtained polyester resin had an acid value of 59, a hydroxyl value of 90 and a number average molecular weight of 1054.

REFERENCE EXAMPLE 3

Preparation of alkyd resin having an amphoionic group:

Into a similar reaction vessel as used in Reference Example 1, were placed 85 parts of dehydrated castor oil, 63 parts of coconut oil, and 53 parts of trimethylol propane and the mixture was heated, under nitrogen atmosphere, to 240° C. and stirred at the same temperature for 30 minutes.

At this stage, methanol tolerance reached to infinity. The temperature was lowered to 150° C., stirring was stopped and then 725 parts of phthalic anhydride, 343 parts of diethylene glycol, 43 parts of trimethylol propane, 375 parts of N,N-bis-(2-hydroxyethyl) aminoethane sulfonic acid and 45 parts of xylene were added. Stirring was again started and temperature was gradually raised while removing the formed water azeotropically with xylene. The temperature was raised to 240° C. in about 2 hours and the dehydration was further continued at the same temperature until the carboxylic acid equivalent acid value reached to 8. Thus obtained alkyd resin had an oil length of 10, an acid value of 66, a hydroxyl value of 100 and a number average molecular weight of 800.

REFERENCE EXAMPLE 4

Preparation of modified epoxy resin having an amphoionic group:

Into a 2 liters flask fitted with a stirrer, a condenser and thermoregulator, were placed 25 parts of taurine, 8 parts of sodium hydroxide, 100 parts of deionized water and 400 parts of ethyleneglycol monoethyl ether and the mixture was heated, under stirring, to 100° C. After a clear solution was obtained, a solution of 190 parts of Epicoat 828 (bisphenol A diglycidyl ether type epoxy resin, epoxy equivalent 190, manufactured by Shell Chem. Co.) in 200 parts of ethyleneglycol monoethyl ether was dropwise added in 2 hours. After completion of said addition, the combined mixture was heated and stirred for 5 hours. The reaction solution was then acidified with hydrochloric acid and the formed precipitates were filtered, purified by a reprecipitation means with ethyleneglycol monoethyl ether and water and dried under reduced pressure to obtain 205 parts of modified epoxy resin. The acid value of this resin (KOH titration) was 48.6 and sulfur content (fluorescent X ray analysis) was 3%.

REFERENCE EXAMPLE 5

Prepration of acryl resin having an amphoionic group:

Into a similar reaction vessel as used in Reference Example 1, were placed 100 parts of ethyleneglycol monomethyl ether and it was heated to 120° C. and maintained at the same temperature. A solution of 100 prts of ethyleneglycol monomethyl ether and 25 parts of N-(3-sulfopropyl)-N-methacryloxyethyl-N,N-dimethylammonium betaine was placed in a dropping funnel and a solution of 60 parts of 2-hydroxy ethyl acrylate, 30 parts of acrylic acid, 120 parts of methyl methacrylate, 120 parts of styrene, 145 parts of 2-ethyl hexyl acrylate 7 parts of lauryl mercaptane, and 10 parts of azobisisobutyronitrile was placed in another dropping funnel.

Both solutions were dropwise and simultaneously added to the reactor in 120 minutes and the combined mixture was stirred at 100° C. for 60 minutes. Thereafter, the solvent was removed by using a rotary evaporator to obtain an acryl resin having a solid content of 94%. The number average molecular weight of the resin was 7000.

REFERENCE EXAMPLE 6

Preparation of acryl resin having an amphoionic group:

Repeating the same procedures as stated in Reference Example 5 but using the materials shown below, an acryl resin having a solid content of 97% and a number average molecular weight of 3900 was prepared.

| | |
|---|---|
| N,N—dimethyl-N—(vinylbenzyl) ammonio acetic betaine | 100 parts |
| 2-hydroxyethyl acrylate | 50 |
| acrylic acid | 25 |
| methyl methacrylate | 80 |
| styrene | 80 |
| n-butyl acrylate | 165 |
| lauryl mercaptane | 15 |
| azobisisobutyronitrile | 10 |
| ethyleneglycol monomethyl ether | 200 |

REFERENCE EXAMPLE 7

Preparation of a water soluble acryl resin varnish:

Into a 1 liter flask fitted with a stirrer, a nitrogen gas inlet tube, a thermoregulator and a condenser, were placed 100 parts of diethyleneglycol monobutyl ether and it was heated to 125° C. While maintaining the same temperature, a mixture of 70 parts of styrene, 40 parts of methyl methacrylate, 40 parts of 2-hydroxyethyl acrylate, 125 parts of 2-ethyl hexyl acrylate, 25 parts of methacrylic acid, 2.5 parts of laurylmercaptane and 5 parts of azobisisobutyronitrile was dropwise added to the reactor in minutes, and thereafter, the combined mixture was stirred and reacted at 100° C. for 2 hours. A mixture of 40 parts of dimethyl ethanol amine and 400 parts of deionized water was added to obtain an acryl resin varnish having a non-volatile content of 35%. The number average molecular weight of the resin contained was 6500.

REFERENCE EXAMPLE 8

Preparation of a water soluble acryl resin varnish:

Into a 1 liter stainless steel vessel, were placed 213 parts of acryl resin having an amphoionic group obtained in Reference Example 5, 16 parts of dimethyl ethanol amine, 272 parts of deionized water and 70 parts of diethyleneglycol mono-n-butyl ether and the mixture was stirred well to obtain a water soluble acryl resin varnish having a non-volatile content of 35%.

EXAMPLE 1

Into a 1 liter reaction vessel fitted with a stirrer, a condenser and a thermoregulator, were placed 500 parts of deionized water, 60 parts of ethyleneglycol mono-n-butyl ether, 120 parts of polyester resin obtained in Reference Example 1 and 12 parts of dimethyl ethanol amine and the mixture was heated and stirred at 80° C. to make a clear solution. To this, a mixture of 30 parts of methyl methacrylate, 50 parts of n-butyl acrylate, 30 parts of styrene, 10 parts of 2-ethyl hexyl acrylate, 5 parts of laurylmercaptane and 2 parts of azobisisobutyronitrile was dropwise added in 2 hours and the combined mixture was reacted, under stirring, at 80° C. for 2 hours to obtain an aqueous dispersion type resin composition having a non-volatile content of 29% and an average grain size of the resin particles of 0.13 μ.

Thus obtained composition contained only small amount of agglomerates and even after standing for 3 months at a room temperature, stability was excellent, showing no formation of agglomerates and precipitates.

The abovesaid grain size was determined by a laser beam scattering method.

EXAMPLE 2

Into a similar reaction vessel as used in Example 1, were placed 450 parts of deionized water, 60 parts of ethyleneglycol monobutyl ether, 120 parts of the acryl resin obtaine in Reference Example 5, and 10 parts of dimethyl ethanolamine, and the mixture was heated and stired at 80° C. to make a clear solution. To this, a mixture of 23 parts of methyl methacrylate, 40 parts of n-butyl acrylate, 28 parts of styrene, 24 parts of 2-ethyl hexyl acrylate, 5 parts of diethylene glycol dimethacrylate and 3 parts of azobisisobutyronitrile was dropwise added in 2 hours and the combined mixture was reacted and stirred at 80° C. for 2 hours to obtain an aqueous dispersion type resin composition having a non-volatile content of 31% and an average grain size of 0.14 μ.

Thus obtained composition contained only small amount of agglomerates and even after standing for 3 months at a room temperature, stabilty was excellent, showing no formation of agglomerates and precipitates.

EXAMPLES 3 to 8

Repeating the procedures of Example 1 with the materials shown in Table 1, various aqueous dispersion type resin compositions were prepared.

EXAMPLES 9 to 12

(a) Preparation of pigment paste:

Into a 4 liters closed stainless steel vessel, were placed 571 parts of acryl resin varnish obtained in Reference Example 7, 1000 parts of Tipaque R-930 (Rutile type Titanium oxide pigment, manufactured by Ishihara Sangyo) and 300 parts of deionized water, and, after adding with 1500 cc of glass beads, the mixture was stirred well to obtain a premixed pigment composition. Then the composition was mix-dispersed in a paint conditioner to obtain a pigment paste.

(b) Preparation of coating compositions:

Into a stainless steel vessel, the materials shown in Table 2 were placed and the combined mixture was stirred well to obtain a coating composition, respectively.

(c) Evaluation of the coating compositions:

Each of the coating compositions of Examples 9 to 12 was diluted with deionized water to a Ford Cup #4 viscosity of 30 seconds.

Thus obtained diluted composition was then spray-coated on a steel plate and after setting for 15 minutes, baked at 150° C. for 20 minutes to obtain a dried coating. 60° gloss of the coating was measured by using a gloss meter and evaluated by the following criteria:

| mark | 60° gloss |
|---|---|
| ⊚ | more than 93 |
| O | more than 90 to 93 |
| Δ | more than 80 to 90 |
| X | 80 or less |

The test results are shown in Table 2.

COMPARATIVE EXAMPLE

Into a 1 liter flask fitted with a stirrer, a nitrogen gas inlet tube, a thermoregulator and a condenser, were placed 150 parts of deionized water and it was heated to 80° C. While maintaining the same temperature, an aqueous solution of 0.2 part of ammonium persulfate in 15 parts of deionized water was first added under stirring, and a pre-emulsion of 117 parts of styrene, 120 parts of 2-ethyl hexyl acrylate, 63 parts of n-butyl acrylate, 15 parts of lauryl mercaptane, 200 parts of deionized water, 10 parts of sodium dodecylbenzene sulfonate and 1.8 parts of ammonium persulfate was then dropwise added in 2 hours. After completion of said addition, the combined mixture was stirred for 30 minutes, added with an aqueous solution of 0.36 part of ammonium persulfate in 15 parts of deionized water, and then stirred for 2 hours to obtain a comparative emulsion having a non-volatile content of 41% and an average grain size of 0.25 μ.

A coating composition was prepared with this emulsion as in Examples 9 to 12 and evaluated in the same way. The test results are also shown in Table 2.

TABLE 1

| | water soluble resin parts | amine parts*1 | deionized water parts | organic solvent parts*2 | α,β-ethylenically unsaturated monomer*3 | | | | |
|---|---|---|---|---|---|---|---|---|---|
| | | | | | MMA | n-BA | St | EHA | HEA |
| Example 3 | Ref. Ex. 2, 120 | DMEA, 12 | 360 | E.C, 60 | 20 | 30 | 40 | 30 | — |
| Example 4 | Ref. Ex. 3, 100 | DMEA, 10 | 360 | PGM, 75 | 25 | 24 | 38 | 53 | — |
| Example 5 | Ref. Ex. 4, 80 | DMEA, 11 | 400 | E.C, 60 | 28 | 47 | 42 | 38 | 5 |
| Example 6 | Ref. Ex. 5, 120 | DMEEA, 14 | 400 | BDG, 42 | — | 25 | 47 | 48 | — |
| Example 7 | Ref. Ex. 5, 90 | DMEEA, 12 | 500 | B.C, 38 | 27 | 52 | 29 | 42 | — |
| Example 8 | Ref. Ex. 6, 150 | DMEEA, 14 | 350 | BDG, 60 | 19 | — | 38 | 33 | — |

| | LM parts*4 | initiator parts*5 | non-volatile content (%) | average grain size (μ) | time stability 3 months at room temp. |
|---|---|---|---|---|---|
| Example 3 | 4 | AIBN, 2 | 35 | 0.16 | good |
| Example 4 | 3 | Perbutyl-PV, 2 | 33 | 0.19 | good |
| Example 5 | 5 | AIBN, 2 | 32 | 0.21 | good |
| Example 6 | 5 | AIBN, 2 | 33 | 0.17 | good |
| Example 7 | 4 | AIBN, 3 | 28 | 0.15 | good |
| Example 8 | 3 | AIBN, 2 | 34 | 0.17 | good |

*1DMEA—dimethylethanolamine
DMEEA—dimethylethoxy ethanolamine
*2E.C—ethyleneglycol monoethyl ether
PGM—propyleneglycol monomethyl ether
BDG—diethyleneglycol monobutyl ether
B.C—ethyleneglycol monobutyl ether
*3MMA—methylmethacrylate
n-BA—butyl acrylate
St—styrene
EHA—2-ethylhexyl acrylate
HEA—2-hydroxyethyl acrylate
*4LM—lauryl mercaptane
*5AIBN—azobisisobutyronitrile
Perbutyl-PV—t-butyl perpivalate

TABLE 2

| | pigment paste | coating composition | | | | | | |
|---|---|---|---|---|---|---|---|---|
| | | aqueous dispersion type resin composition | | water soluble resin | | | Comp. emulsion | |
| | | Example | parts | Ref. Ex. | parts | MF | parts | gloss |
| Example 9 | 94 | 1 | 103 | 7 | 14 | 7 | — |  |
| Example 10 | 94 | 2 | 97 | 7 | 14 | 7 | — |  |
| Example 11 | 94 | 6 | 91 | 7 | 14 | 7 | — |  |
| Example 12 | 94 | 6 | 91 | 8 | 14 | 7 | — |  |
| Comp. Ex. | 94 | | | 7 | 57 | 7 | 37 | Δ |

TABLE 2-continued

| | pigment paste | coating composition | | | | | | |
|---|---|---|---|---|---|---|---|---|
| | | aqueous dispersion type resin composition | | water soluble resin | | | Comp. emulsion | |
| | | Example | parts | Ref. Ex. | parts | MF | parts | gloss |

What is claimed is:

1. An aqueous coating composition comprising as a resinous vehicle
(1) an aqueous dispersion resin composition obtained by polymerizing at least one α, β-ethylenically unsaturated monomer in an aqueous medium in the presence of a water soluble resin having an amphonic group of the formula:

$$-\underset{|}{N}-R-Y$$

in which R is a substituted or unsubstituted $C_1$ to $C_6$ alkylene or phenylene group and Y is —COOH or —SO$_3$H, said resin selected from the group consisting of an alkyd resin, a polyester resin, an acryl modified alkyd resin, an acryl modifed polyester resin, a modified epoxy resin, an acrylic resin, a melamine resin and a polyether resin, and a water insoluble organic initiator, the weight ratio of said water solouble resin in solid form to said monomer being 10:90 to 90:10, and
(2) an acrylic water soluble resin having no amphionic group of the formula:

$$-\underset{|}{N}-R-Y$$

in which R and Y are as defined above.

2. A composition according to claim 1, wherein the aqueous medium further contains and organic solvent.

* * * * *